United States Patent [19]
Patrichi

[11] 3,991,649
[45] Nov. 16, 1976

[54] PYROTECHNIC WIRE CUTTER

[75] Inventor: Mihai D. Patrichi, Los Angeles, Calif.

[73] Assignee: Networks Electronic Corporation, Chatsworth, Calif.

[22] Filed: June 27, 1975

[21] Appl. No.: 591,129

[52] U.S. Cl. .................................. 89/1 B; 60/636; 89/1.5 F
[51] Int. Cl.² ............................................ F42B 3/00
[58] Field of Search ............ 89/1 B, 1.5 F; 166/55, 166/55.1, 54.5, 54.6; 60/635, 636, 632; 102/49.4, 49.5; 244/150

[56] References Cited
UNITED STATES PATENTS

| | | | |
|---|---|---|---|
| 2,140,214 | 12/1938 | Temple | 60/636 X |
| 2,140,338 | 12/1938 | Temple | 60/636 X |
| 2,897,799 | 8/1959 | Stupian | 244/150 X |
| 2,924,147 | 2/1960 | Bohl et al. | 89/1 B |
| 2,926,565 | 3/1960 | Thorness | 89/1 B |
| 2,942,818 | 6/1960 | Stott | 244/150 |
| 3,199,288 | 8/1965 | Nahas | 60/635 |
| 3,320,669 | 5/1967 | Chandler et al. | 89/1 B X |
| 3,766,979 | 10/1973 | Petrick | 166/55 |

*Primary Examiner*—David H. Brown
*Attorney, Agent, or Firm*—Lynn H. Latta

[57] ABSTRACT

A piston, normally contained in a retracted position within a cylinder, is projected by electrical detonation of an explosive charge which is contained within the cylinder between a sealed end thereof and a piston having a circular cutting edge at its end remote from the explosive charge, such remote cutting end being normally held in spaced relation to a wire extending through diametrically opposite openings in the cylinder, by a shock-security pin or equivalent means, of a material of sufficient softness to be readily sheared upon detonation of the charge, allowing the piston to advance into shearing engagement with the wire.

6 Claims, 5 Drawing Figures

PYROTECHNIC WIRE CUTTER

BACKGROUND OF THE INVENTION

Line cutters of a type utilizing a cylinder-contained, explosion-propelled piston having at its forward end a circular cutting edge for severing the load line of a balloon or the reefing line of a parachute, have hitherto been disclosed in patents such as Bohl, U.S. Pat. Nos. 2,924,147; Gross, 2,742,697; Stupian, 2,897,799; and Stott, 2,942,818. The Stott patent also discloses a shear pin, extending through the cylinder wall into the piston, for normally restraining the piston in its retracted position. Other patents disclosing cylinder-contained pistons propelled by detonation of an explosive charge within the cylinder, are Fritz, U.S. Pat. Nos. 3,111,808; Davis, 2,132,148 and Barr, 3,119,302.

Resume of the Invention

An object of the invention is to provide an explosive cartridge which is hermetically sealed and separately fixed inside the cutter cylinder so as to be capable of withstanding environmental conditions with a rugged characteristic.

Another object is to provide an explosive cutter unit having means to securely hold the cutter piston in a retracted position until firing is effected. In one aspect, the piston has a stem projecting rearwardly through a seal ring and attached, as by welding, to the forward end of the explosive cartridge. An alternative construction, utilizing a holding pin of soft material which is readily sheared upon firing, can dispense with the stem for fastening the rear end of the piston to the explosive cartridge, utilizing simply a soft, resilient pad between the rear end of the piston and the forward end of the explosive cartridge for containing the explosive gases.

A further object is to provide a cutter piston of maximum simplicity combined with maximum effectiveness in severing a sleeved wire at diametrically opposite points within its containing cylinder, and in receiving the severed wire slice. To this end, the cutting end of the piston is provided with a deep cavity defined within a conical wall of approximately 60° spread.

Other objects will become apparent in the ensuing description and appended claims. In the drawings:

Figure 1:
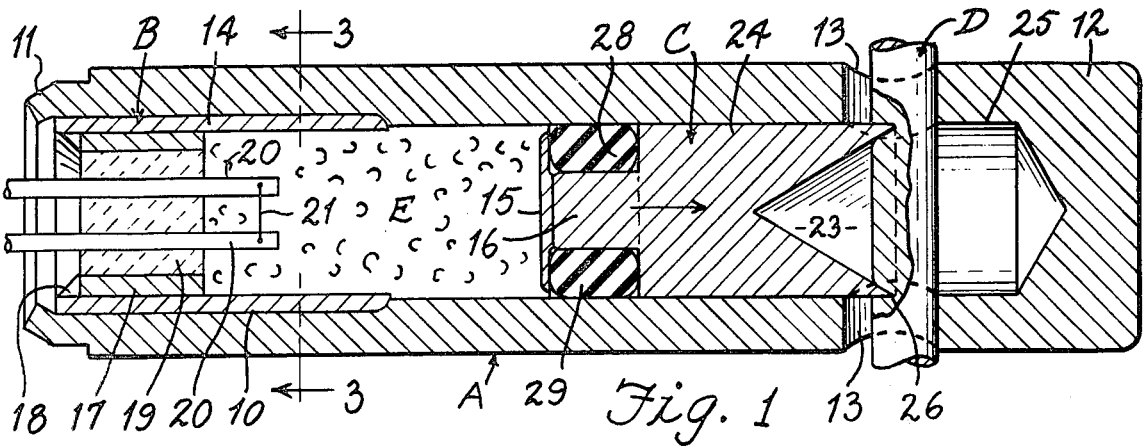
FIG. 1 is a longitudinal, axial sectional view of a pyrotechnic actuated wire cutter embodying a preferred form of the invention.
Figures 2, 3:
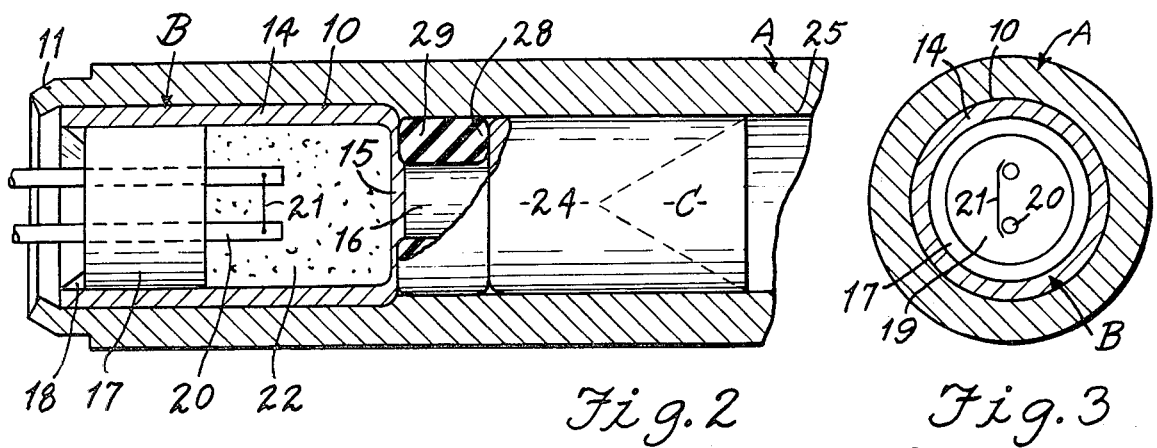
FIG. 2 is a fragmentary axial sectional view, with parts shown in elevation.
FIG. 3 is a transverse sectional view taken on line 3—3 of FIG. 1.

Referring now to the drawing in detail, I have shown therein, in FIGS. 1 and 2, a wire cutter embodying, in general, a containing cylinder A; an explosive cartridge B in one end thereof; a piston C (FIG. 2) attached to the inner end of cartridge B; and a wire D to be cut by detonation of cartridge B, as indicated in FIG. 1 in which the explosion of cartridge B is indicated at E.

Figure 4:
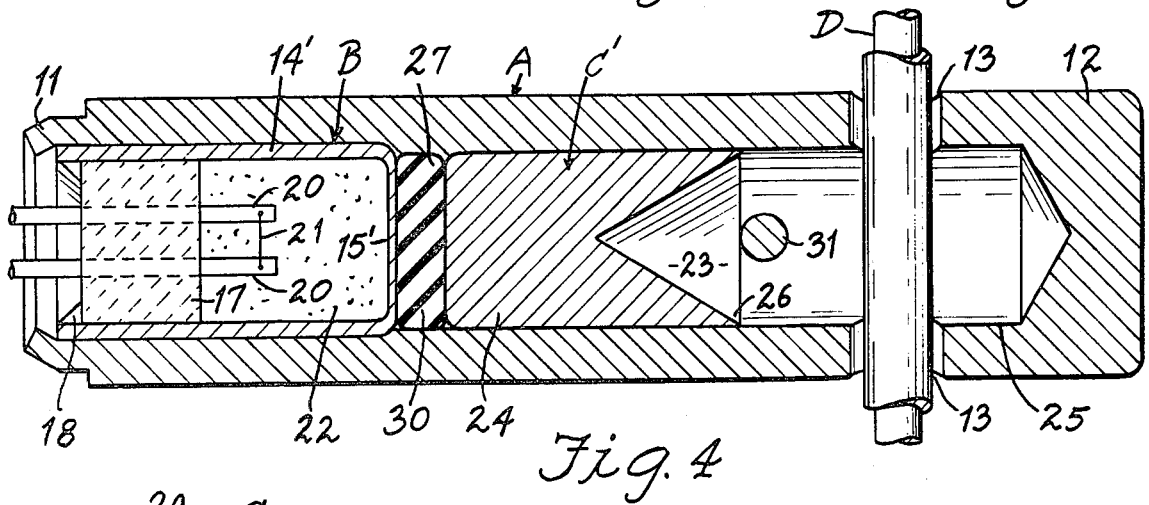
FIG. 4 is an axial sectional view of a modified form of the invention.

Cylinder A has in its rear end a counterbore 10 in which cartridge B is seated. An inturned lip 11 at the rear end of the cylinder secures the cartridge in place. At its forward end the cylinder is closed by a head 12, and has a pair of diametrically opposed apertures 13 through which the wire D extends, as best shown in FIG. 4.

Explosive cartridge B comprises a cup-shaped container 14 including a cylindrical wall fitted in counterbore 10 and a bottom 15 which is welded or otherwise attached to the rear end of stem 16 of piston C. A header, which closes and seals the rear end of container 14, comprises a metal collar 17, fitted snugly within container 14 and sealed to the projecting rear end thereof by a solder ring 18; a glass plug 19, sealed to the inner surface of collar 17 by a glass-to-metal seal of a known type; and a pair of ignition wires 20, extending through and sealed within the plug 19 and at their inner ends, connected by a thin wire bridge 21 which is spot-welded at its respective ends to the respective wires 20. The container 14 is filled with an explosive charge of powder 22 which will be readily ignited by ignition wire 21 when heated by a detonating current transmitted through ignition leads 20. In the resulting explosion E, the bottom 15 of container cup B will be torn loose from the cylindrical wall of the cup and will function as the head of a piston which, in reaction to the explosion, will drive the cutting edge of the piston C through the wire D, shearing off the section of wire traversing the bore of cylinder A. The sheared section will be received in a conical cavity 23 in the forward end of piston C.

Figure 5:
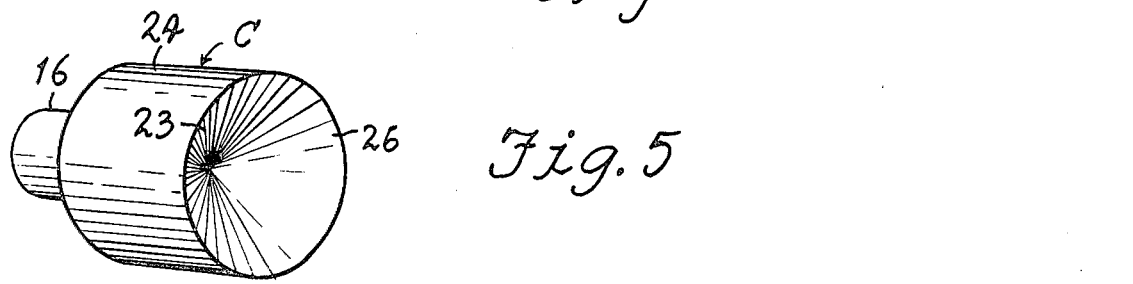
FIG. 5 is a perspective view of the piston of FIGS. 1 and 2.

Piston C, in its form shown in FIGS. 1, 2 and 5, comprises a body 24 having a cylindrical lateral surface fitted to the internal wall of the cylinder bore 25, with sufficient looseness to be readily slidable therein in response to the force of explosion E, yet with sufficient closeness to effect a clean shearing action against wire D when driven thereagainst by the explosion. The cutter piston is of tool steel, and the conical wall of cavity 23 (of approximately 60° included angle) intersects its cylindrical outer surface to define a circular cutting edge 26 which is razor-sharp. A cylindrical stem 16, coaxial with piston body 24, projects rearwardly from an annular flat shoulder 28 at the rear end of piston C, and is spot-welded to cartridge bottom 15 so as to hold the piston in fully retracted position until explosion of cartridge B. Seated on annular shoulder 28, and encircling stem 16 in sealing engagement therewith and with cylinder bore 25, is a gasket washer 29 of sufficient compressibility and elasticity to maintain a pressure-sealing action in containing the gases of explosion E in cylinder bore 25 behind the piston, so as to utilize the full force of the explosion in driving the piston entirely through the wire D.

Spot-welding of stem 16 to cartridge bottom 15 is performed previous to the insertion of explosive charge 22, and subsequently to its insertion through gasket washer 29.

Cylinder bore 25 has sufficient depth, beyond shearing apertures 13, to insure complete and clean severance of wire D and reception of any portion of the severed fragment thereof which may project from cavity 23. Igniter assembly 17, 19, 20, 21 is tested for leakage before being mounted in container 14, and after being mounted therein, is sealed by solder joint 18. After introducing piston C and cartridge B into cylinder A, the rear end of the cylinder is crimped against the outer end of cartridge B, to fix the cartridge in place.

In the modified form of the invention shown in FIG. 4, the piston C' has a squared rear end 27 bearing flatly against a seal disc 30 interposed between the bottom 15' of container 14' and rear piston end 27 and held in such bearing engagement by a retainer pin 31 bearing against the cutting edge of the piston and having one or both ends mounted in one or two fitted apertures in the wall of cylinder A. Retainer pin 31 is of a soft metal such as brass or aluminum which is adapted to be readily sheared. It is positioned perpendicular to the direction of cutting movement of the piston, on an axis extending diametrically of the cylinder. It is mounted at only one end where shock requirements are moderate, and at both ends where the requirements are more severe. Since the shearing of pin 31 occurs before the wire D is contacted by the piston, the entire gas pressure is available for each cutting.

Since the invention provides for a symmetrical double cutting, with a shearing action rather than a single cut against an anvil, it avoids the necessity of having the wire to be cut under tension in order to avoid the cut ends of the wire or cable being caught by the internal moving parts. No plastic or thread from the wire sleeving can be caught in the cutter.

I claim as my invention:

1. A pyrotechnic line cutter comprising:
   a housing cylinder having a bore and a counterbore separated by an annular shoulder;
   an explosive cartridge in said counterbore, having a forward end seated on said shoulder;
   said cylinder having an open rear end crimped inwardly against the rear end of said cartridge and securing the same against the reactive force of explosion thereof;
   a piston fitted in said bore for forward longitudinal sliding movement therein, in response to the expansive forces of explosion of said cartridge, said piston having a cutting edge at its forward end, said cutting edge being in sliding contact with the wall of said bore;
   said cylinder having a pair of diametrically opposed apertures through which a line to be cut extends;
   and means normally holding said piston in a retracted position with said cutting edge spaced rearwardly of said line apertures;
   said bore extending forwardly beyond said line apertures sufficiently for said cutting edge to cut entirely through said line at diametrically opposed positions, leaving a severed section of said line between the forward end of the piston and the forward end of said bore; said piston having at its rear end a projecting axial stem and an annular shoulder at the base of said stem; and a gasket washer encircling said stem and seated on said shoulder, said washer sealing said piston to the wall of said bore, to contain the gases of explosion behind the piston; the end of said stem being spot-welded to the forward end of said cartridge.

2. A pyrotechnic line cutter as defined in claim 1, said cylinder having a closed forward end of such thickness as to arrest forward projection of said piston and to contain the gases of explosion.

3. A pyrotechnic line cutter comprising:
   a housing cylinder having a bore and a counterbore separated by an annular shoulder;
   an explosive cartridge in said counterbore, having a forward end seated on said shoulder;
   said cylinder having an open rear end crimped inwardly against the rear end of said cartridge and securing the same against the reactive force of explosion thereof;
   a piston fitted in said bore for forward longitudinal sliding movement therein in response to the expansive forces of explosion of said cartridge, said piston having a cutting edge at its forward end, said cutting edge being in sliding contact with the wall of said bore;
   said cylinder having a pair of diametrically opposed apertures through which a line to be cut extends;
   and means normally holding said piston in a retracted position with said cutting edge spaced rearwardly of said line apertures;
   said bore extending forwardly beyond said line apertures sufficiently for said cutting edge to cut entirely through said line at diametrically opposed positions, leaving a severed section of said line between the forward end of the piston and the forward end of the bore;
   said piston holding means comprising an axial stem projecting rearwardly from the rear end of said piston, and attached to the front end of said cartridge, said front end being detached from the remainder of the cartridge by the force of the explosion; and a gasket washer encircling said stem and sealing the piston to the wall of said bore.

4. A pyrotechnic line cutter comprising:
   a housing cylinder having a bore and a counterbore separated by an annular shoulder;
   an explosive cartridge in said counterbore, having a forward end seated on said shoulder;
   said cylinder having an open rear end crimped inwardly against the rear end of said cartridge and securing the same against the reactive force of explosion thereof;
   an integral piston fitted in said bore for forward longitudinal sliding movement therein in response to the expansive forces of explosion of said cartridge, said piston having a cutting edge at its forward end, in sliding contact with the wall of said bore;
   said piston having at its rear end an integral projecting axial stem and an annular shoulder at the base of said stem;
   a gasket washer encircling said stem and seated on said shoulder, said washer sealing said piston to the wall of said bore to contain the gases of explosion behind the piston;
   said cylinder having a pair of diametrically opposed apertures through which a line to be cut extends;
   and means normally holding said piston in a retracted position with said cutting edge spaced rearwardly of said line apertures;
   said piston holding means consisting of a securing attachment between the forward end of said cartridge and the rear end of said piston stem;
   said bore extending forwardly beyond said line apertures sufficiently for said cutting edge to cut entirely through said line at diametrically opposed positions, leaving a severed section of said line between the forward end of the piston and the forward end of said bore.

5. A pyrotechnic line cutter as defined in claim 4, including a pad of sealing material interposed between the rear end of said piston and the forward end of said cartridge, said pad sealing said piston to the wall of said bore so as to contain the gases of explosion behind the piston.

6. A pyrotechnic line cutter comprising:
   a housing cylinder having a bore and a counterbore separated by an annular shoulder;

an explosive cartridge in said counterbore, having a forward end seated on said shoulder;

said cylinder having an open rear end crimped inwardly against the rear end of said cartridge and securing the same against the reactive force of explosion thereof;

a piston fitted in said bore for forward longitudinal sliding movement therein in response to the expansive forces of explosion of said cartridge, said piston having at its forward end a cutting edge in sliding contact with the wall of said bore;

said cylinder including an integral forward portion having a pair of diametrically opposed apertures through which a line to be cut may extend;

and means normally holding said piston in a retracted position with said cutting edge spaced rearwardly of said line apertures, said means consisting of a pin of shearable material having respective ends mounted in apertures in opposite sides of said cylinder's forward portion, said pin engaging said cutting edge and blocking forward movement of said piston until sheared by explosive projection of said piston;

said bore extending forwardly beyond both sets of said apertures sufficiently for said cutting edge to cut entirely through said line at diametrically opposite positions, leaving a severed section of said line between the forward end of the piston and the forward end of said bore.

* * * * *